Patented Sept. 20, 1932

1,878,052

UNITED STATES PATENT OFFICE

AMYUIT L. WILSON AND STEWART H. HULSE, OF ELIZABETH, NEW JERSEY, ASSIGNORS TO STANDARD OIL DEVELOPMENT COMPANY, A CORPORATION OF DELAWARE

CENTRIFUGAL LIQUID AND GAS SEPARATOR

Application filed February 2, 1931. Serial No. 512,798.

Figure 1:
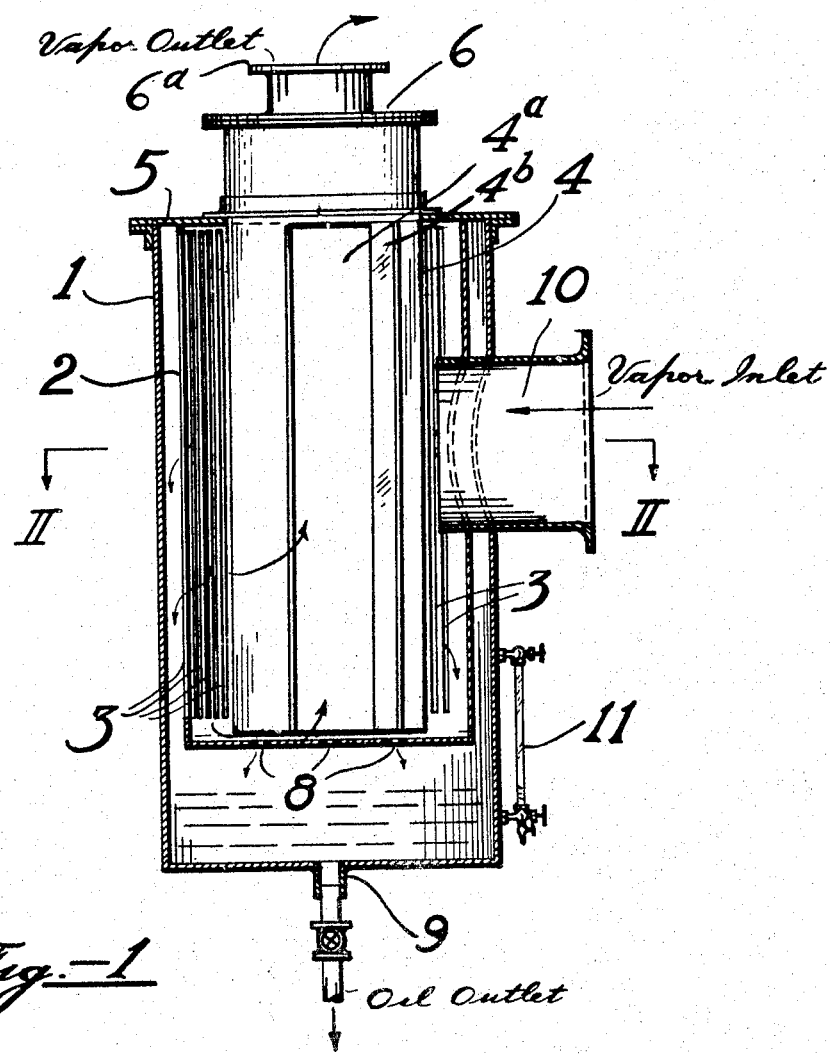
Figure 2:
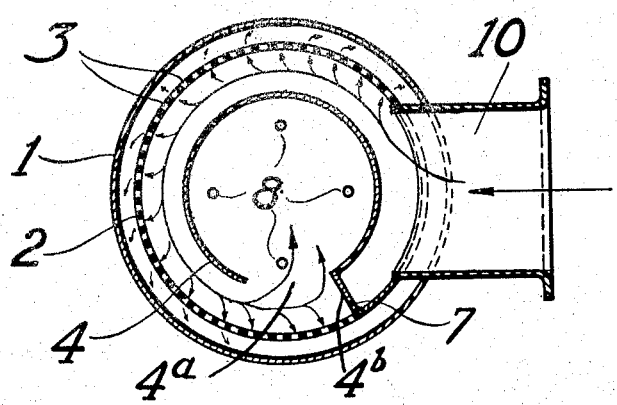

This invention relates to new and useful improvements in liquid and gas separators. The object of the invention is to separate unvaporized liquids from flowing vapors and to collect such liquid so that it may be pumped or otherwise conveyed to a suitable storage reservoir. This and other objects, as will hereinafter appear, are accomplished by the invention which is fully described in the following specification and shown in the accompanying drawing, in which Fig. 1 is a vertical section through the liquid and gas separator, and Fig. 2 is a horizontal section on the line II—II of Fig. 1.

The embodiment illustrated comprises a closed cylindrical tank 1. An internal shell 2 is arranged in tank 1 and extends from the top nearly to the bottom of the tank. The interior of the tank communicates with the annular space between the tank and shell 2 by means of a number of slots 3 in the wall of the shell. This is closed at the top with a plate 5 having an opening in the center for the outlet of the vapors. The bottom of tank 1 has an outlet pipe 9. The bottom of shell 2 has a number of circular openings 8 to communicate with the space between 1 and 2.

A smooth wall 4 concentric with the shell 2 is provided. This wall has a vertical slot 4a and a baffle 4b at the margin of the slot. Wall 4, where it extends above the top 5 of the tank is closed on the sides and has an opening in the top 6 for outlet of vapors thru vapor line 6a. The baffle 4b extends across the space between shell 2 and wall 4 at a point 7 near the inlet of liquids and vapors, so that the vapors are forced to circle wall 4 until they reach the slot 4a and enter into the circular space within the wall. Thence they escape thru line 6a. The liquids are separated as described below.

The liquid and gas enter the inlet 10 at high speed and meeting the smooth circular wall 4 acquire a centrifugal motion. The liquid is thrown outward and is discharged thru slots 3 in wall 2, into the space between the tank and shell 2. This space becomes filled with a body of gas which remains substantially at rest. Some of the liquid is deposited on the wall 4 and flows down the same and by means of circular holes 8 runs into the space between tank 1 and shell 2. The separated liquid is now removed from the separator by means of outlet 9 and the vapors escape through outlet 6. A suitable gauge 11 is provided at the bottom of tank 1 to indicate the level of liquid in the tank. A separator of the type described 2 feet in diameter and 6 feet long connected to an 8 inch steam pipe line removes 30 gallons of water and oil each hour. A body of liquid trapped in the line and suddenly released coming into the separator in one spurt is readily removed.

To those skilled in the art to which our invention relates many modifications and different embodiments of the invention and applications thereof will suggest themselves without departing from the spirit and scope thereof, and in the appended claims we desire to claim all novelty inherent in the invention as broadly as the prior art permits.

We claim:

1. A gas and liquid separator comprising an outer container, concentric circular walls therein forming an annular space, means for directing a current of liquid-carrying gas against the inner concentric wall in a manner to cause the gas to acquire centrifugal motion, the outer concentric wall having openings for permitting escape of liquid thrown outward by the centrifugal motion, a bottom wall closing the outer concentric wall in spaced relation to the inner concentric wall, means for deflecting the gas freed of liquid after the gas has completed the circuit of the inner concentric wall, and means for venting the gas into the space defined by the inner concentric wall and thence from the container.

2. Apparatus according to claim 1, in which the inner concentric wall is arranged directly opposite the inlet for liquid-carrying gas, and the deflecting means is in the form of a baffle between the inner and outer concentric walls, said baffle being arranged at a point adjacent the means for introducing the gas-carrying liquid.

3. A gas and liquid separator comprising an upright closed tank, an outlet at the bottom thereof for removing liquid, a shell of smaller diameter within the tank and extending toward the bottom thereof and having a bottom wall, leaving a space between the bottom and sides of the tank and the shell, said shell having narrow vertical slots in its wall and small openings in the bottom to communicate with the space between the shell and tank, means for closing the top of the shell, a pipe discharging into the shell near the top thereof and extending through the walls of the tank and the shell, a smooth central circular wall terminating in spaced relation to the bottom wall with a port opening into the space within the wall, adjacent to the pipe discharging into the shell but closed off from said pipe on the near side by a part of the wall extending to the shell, the said central circular wall having a port extending above the tank and shell and closed on the sides and opening at the top to allow gas to escape.

4. In a fluid and gas separator, an upright tank, closed at the top, a fluid outlet at the bottom of the tank, a shell within the tank and spaced from the tank walls and having a bottom wall, a fluid inlet extending through the shell and tank walls, said shell having vertical slots extending down the major part of its walls, fluid outlets in the bottom wall of the shell, a separating cylinder in the shell having both ends open, and provided with an opening in its wall, a deflector extending to the side of the shell adjacent to the fluid inlet to the shell, and a gas escape pipe joined to the upper open end of cylinder.

AMYUIT L. WILSON.
STEWART H. HULSE.